United States Patent [19]
Krupp

[11] 3,987,865
[45] Oct. 26, 1976

[54] GAS-CUSHION VEHICLE SKIRT
[75] Inventor: Carroll P. Krupp, Akron, Ohio
[73] Assignee: The B. F. Goodrich Company, Akron, Ohio
[22] Filed: Mar. 19, 1975
[21] Appl. No.: 559,837

[52] U.S. Cl. .............................................. 180/127
[51] Int. Cl.² ............................................ B60V 1/16
[58] Field of Search ......................... 180/116–130

[56] References Cited
UNITED STATES PATENTS

| | | | |
|---|---|---|---|
| 3,318,404 | 5/1967 | Hopkins | 180/122 |
| 3,384,197 | 5/1968 | Bingham | 180/117 |
| 3,502,168 | 3/1970 | Jones | 180/124 X |
| 3,561,558 | 2/1971 | Parkhouse | 180/116 X |
| 3,618,695 | 11/1971 | Wheeler | 180/124 X |
| 3,621,932 | 11/1971 | Tattersall | 180/126 |
| 3,643,758 | 2/1972 | Winter | 180/124 X |
| 3,672,461 | 6/1972 | Riddle | 180/116 X |
| 3,677,361 | 7/1972 | Bertin | 180/121 X |
| 3,782,494 | 1/1974 | Simpson | 180/124 |

*Primary Examiner*—M. H. Wood, Jr.
*Assistant Examiner*—Terrance L. Siemens
*Attorney, Agent, or Firm*—Joseph Januszkiewicz; W. A. Shira, Jr.

[57] ABSTRACT

A flexible skirt assembly for surface effect vehicles having an upper and lower skirt. The upper skirt cooperates with the vehicle body to form a pressurized chamber. The lower skirt has a plurality of segments with adjacent ones having common supports. The upper and lower skirts are supported by a plurality of horizontally spaced cables and with such cables supporting the segments at their upper edges.

10 Claims, 6 Drawing Figures

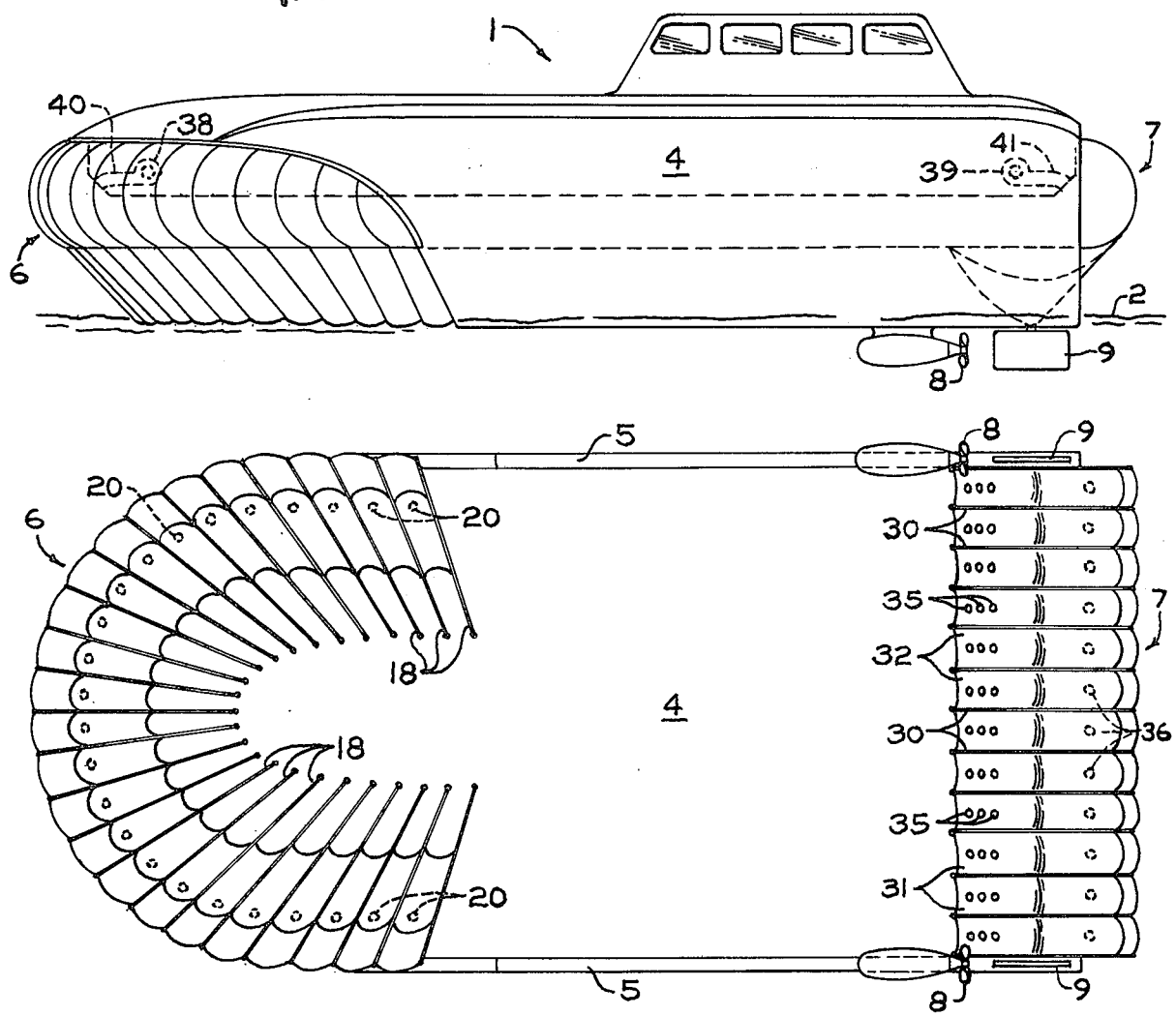
Fig.1
Fig.2
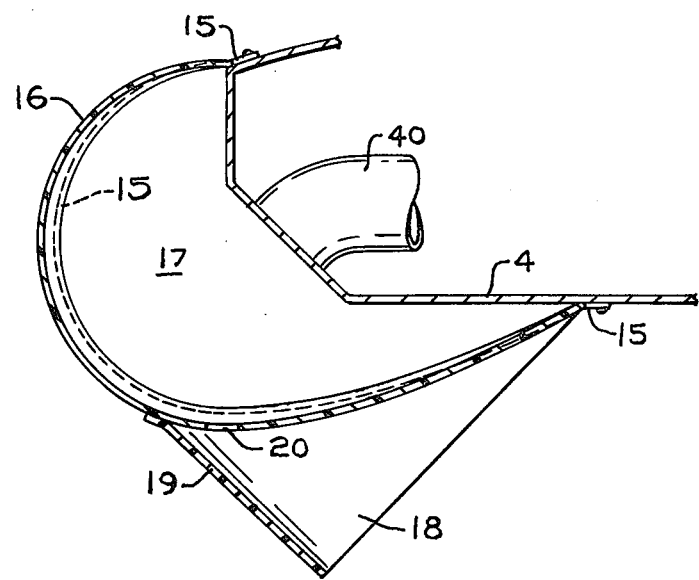
Fig.3

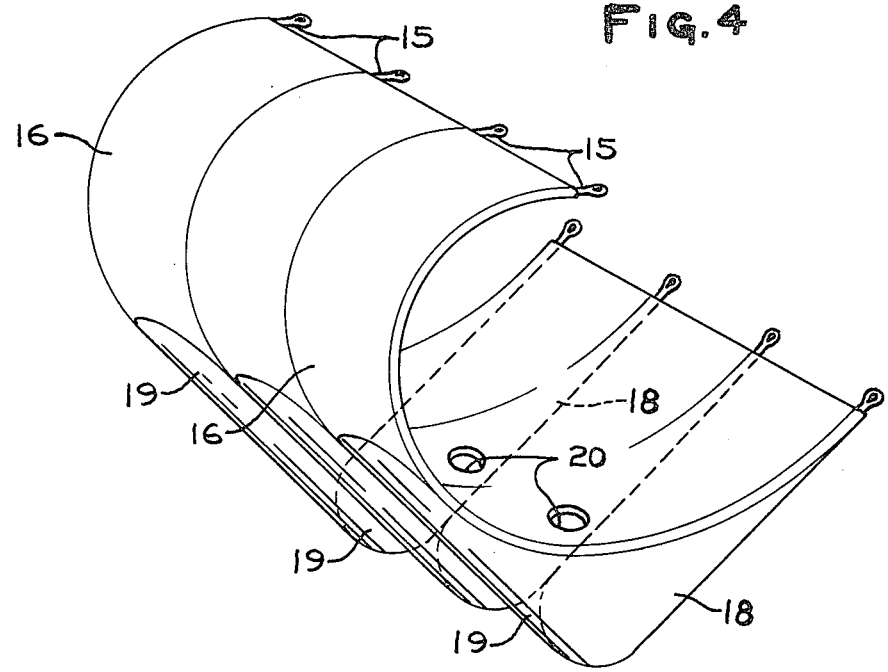
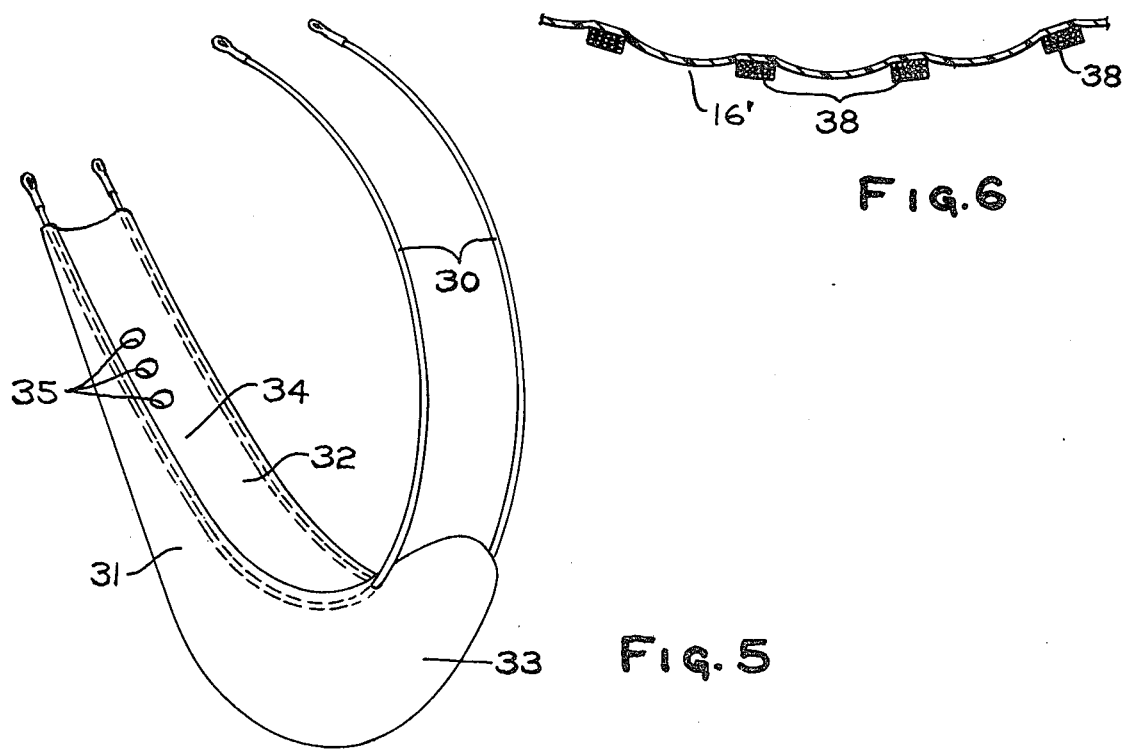

GAS-CUSHION VEHICLE SKIRT

BACKGROUND OF THE INVENTION

This invention relates to gas-cushion vehicles which are also referred to as surface-effect ships, wherein the ship rides on a cushion of air permitting the ship to cruise at a higher speed by reducing the resistance to its movement.

The preferred form of this invention is directed to surface-effect ships that have fixed side walls with flexible skirts or seals fore and aft although such invention is also applicable to where the skirt bounds the entire lower periphery of the vehicle. The side walls cooperate with the skirts to contain the air bubble and act as a keel to give the vehicle greater lateral stability in water. The invention is equally applicable to land vehicles.

In operating vehicles on gas-cushion principles, it is important to provide skirts that are flexible and able to withstand the tremendous impact forces encountered when traversing waves or projections and depressions in the case of land vehicles. The present invention provides a novel suspension system for maintaining the flexible skirt in position, while permitting it to be made of light-weight material and permitting it maximum resiliency. When building ships employing the surface-effect or gas-cushion principle, the carrying capacities have been limited because the skirts which provide the containment of the air cushion must be of adequate strength to withstand the forces developed both internally and externally. By the mere scaling up of existing designs as an example of from a 100 ton to a 2,000 ton vehicle, the strength of the coated fabric materials scales up to a 11,000 pounds tensile per inch of width and the weight of the coated fabric material is estimated to exceed 75 tons. Fabric material in this strength range are not readily available and the processing of such massive structures becomes a major problem. In addition, the seams employed for such fabric material would become cumbersome and extensive to further complicate the problem of weight, processing and fabrication.

The present invention overcomes these difficulties by providing a new and improved construction for the skirt assemblies, wherein the skirt of elastomeric coated fabric membrane or material is supported from the main frame of the vehicle by a plurality of cable-like or belt-like high strength members arranged in vertical planes, which members are the primary load-bearing members of the skirt structure enabling the use of lightweight material since the construction permits a reduction in fabric strength.

SUMMARY

The present invention contemplates a skirt construction assembly which has an upper skirt and a lower skirt with a plurality of segments, wherein a plurality of reinforcing cables, laterally spaced, are attached to adjoining portions of the upper and lower skirts and to the fabric material of the upper skirt in such a manner that the stresses are equalized.

BRIEF DESCRIPTION OF THE DRAWINGS

FIG. 1 is a side elevational view of a gas-cushion vehicle of the fixed sidewall or surface-effect ships;

FIG. 2 is an inverted plan view of the gas-cushion vehicle;

FIG. 3 is an enlarged cross sectional view of the front portion of skirt assembly;

FIG. 4 is a view in perspective of a portion of the front skirt assembly;

FIG. 5 is an enlarged perspective view of a finger of the lower portion of the rear skirt assembly;

FIG. 6 is a plan view in section of a modified form of construction of the skirt assembly.

DETAILED DESCRIPTION

Referring to the drawings wherein like reference characters designate like or corresponding parts through the several views, there is shown in FIG. 1 a gas-cushion vehicle also known as a surface-effect ship 1 of the sidewall type moving over the surface 2 of the water. Such ship 1 is supported above the surface 2 by a cushion of pressurized air formed and contained between the vehicle body 4, the sidewall structures and the fore-and-aft flexible skirt assemblies 6 and 7.

The wall structures are a pair of laterally spaced rigid sidewall members 5 that extend longitudinally along the side of the ship's body 4 in a direction parallel to the body's 4 fore-and-aft axis. The sidewall members 5 of the wall structures extend into the water 2 to contain the air bubble and act as keels to give the ship lateral stability. Side slipping is a major problem in surface-effect ships. Each sidewall member 5 carries a propeller 8 suitably driven and a rudder 9.

The forwardly disposed or front skirt assembly 6 of the surface-effect ship 1 has an upper skirt and a lower skirt. The upper skirt of skirt assembly 6 has a plurality of horizontally spaced cables or constraining means 15 which assume an arcuate shape in a vertical plane. A flexible fabric material 16 forms the upper skirt of skirt assembly 6 by being suitably attached to the respective cables 15 along the entire extent of ship's forward bow to form a closed plenum chamber 17 in cooperation with the forward portion of body 4. The flexible fabric material 16 between the respective cables 15 assumes an arcuate shape in horizontal cross-section as noted in FIG. 2 when the plenum chamber 17 is pressurized.

The lower skirt of front skirt assembly 6 consists of a plurality of successive independent segments wherein each segment has a pair of spaced flexible walls or sidewall members 18 that extend inwardly toward said air cushion. Such sidewall members merge with an outer wall portion 19 to form a channel shaped segment. When inflated, the sidewall members 18 cooperate with the forward portion 19 to form a U-shaped member in cross-section which communicates with the contained cushion of gas. The adjacent sidewall members 18 of neighboring segments are held together by the air-cushion pressure which maintains a seal for the air-cushion. The upper edges of the sidewall members 18 are arcuately contoured to the arcuate depending shape of the lower part of the upper skirt and is suitably attached either to the fabric material or to the cables 15. The cables 15 provide the spacing of the segments and each cable 15 may suitably support upper adjacent contiguous edges of adjacent sidewall members 18 in addition to supporting the flexible fabric material for the upper skirt. The flexible fabric material separating the plenum chamber 17 from the respective segments has a plurality of bores 20 which communicate the pressurized plenum chamber 17 with the respective chamber as defined by the spaced sidewall members 18 and the forward portion 19 of each segment.

The rearwardly disposed flexible skirt assembly 7 is essentially similar to the above described forwardly disposed skirt assembly 6, having a plurality of laterally spaced cables 30 with one end suitably secured to the upper rear portion of the vehicle body 4 and the other end suitably secured to the underneath portion of the body 4. Flexible fabric material is secured to the cables 30 as in the forwardly described embodiment, presenting a plurality of horizontally spaced supporting means. The lower portion of the rear skirt assembly 7 has individual segments as in the front skirt assembly 6 with sidewall members 31–32 of each segment merging with the segments' rearward portion 33. Unlike the forwardly disposed fingers which open directly to the air-cushion 4, the rear segments have the respective side members 31–32 merging with a forwardly disposed portion 34 to prevent scooping up of water as the surface-effect ship moves through the water. The forwardly disposed portion 34 has a plurality of bores 35 communicating the chamber defined by the side members 31–32, the forwardly and rearwardly disposed portions 33 and 34 with the contained air-cushion. The fabric material secured to cables 30 forming the rear upper skirt separates the chamber so formed by such skirt with the body 4 and communicates with the chamber formed by the rear segments via bores 36 (FIG. 2) such as to maintain all such rear segments pressurized as well as contributing to the overall air-cushion contained by the sidewall members 5 and the fore-and-aft skirt assemblies 6 and 7.

Such contained air-cushion is formed by drawing in atmospheric air through suitable in-takes, and by means of compressors 38 and 39 driven by suitable engines provide pressurized air via ducts 40 and 41 to the respective upper plenum chambers of the fore-and-aft skirt assemblies 6 and 7. The pressurized air in plenum chamber 17 of forwardly disposed skirt assembly 6 pressurizes the chamber of the segments therebelow via bores 20 to maintain the fingers in distended position and communicates directly with the supporting or contained air-cushion of the vehicle. The pressurized air in the plenum chamber of the upper skirt of the rearwardly disposed assembly 7 pressurizes the chamber of the rear segments therebelow via bores 35 to the contained air-cushion of the vehicle. With the aid of propellers 8, and with the use of the air-cushion so provided the vehicle or surface-effect ship is propelled across the surface 2 with the skirt assemblies deflecting sufficiently to conform to waveform surface minimizing drag and air leakage. The use of a single skirt is also contemplated where the skirt employs a plurality of cables or constraining means in vertical planes as described above to provide the primary load-bearing members for the elastomeric coated fabric flexible membrane of the skirt structure.

A modification of means for reinforcing the skirt assemblies is shown in FIG. 6 wherein the flexible fabric material 16 is bonded to a plurality of laterally spaced belt fabric bands or constraining means 38. Such bands can be made from nylon, steel, kevlar strand material or other suitable strand material having suitable strengths which are impregnated with rubber to facilitate their attachment to the skirt fabric material.

It will be apparent that, although a specific embodiment and certain modifications of the invention have been described in detail, the invention is not limited to the specifically illustrated and described constructions since variations may be made without departing from the principles of the invention.

I claim:

1. A gas-cushion vehicle having a skirt assembly, said skirt assembly having flexible fabric material cooperative with said vehicle to form a plenum chamber, means connected to said plenum chamber for supplying pressurized fluid thereto, a plurality of constraining means horizontally spaced and extending in vertical planes, each of said constraining means having their respective ends secured directly to said vehicle, and said constraining means being secured to said fabric material along its length to provide the primary load-bearing means for said skirt assembly.

2. A gas-cushion vehicle as set forth in claim 1 wherein said constraining means hold said fabric material between adjacent constraining means in arcuate concave form as viewed in horizontal cross-section.

3. A gas-cushion vehicle having a skirt assembly, said skirt assembly having an upper skirt and a lower skirt, said upper skirt having fabric material extending outwardly therefrom and cooperative with said vehicle to form a plenum chamber, a plurality of constraining means horizontally spaced and extending in vertical planes being secured at their respective ends to said vehicle, said constraining means being secured to said fabric material along the continuous length thereof, and pressurizing means connected to said chamber and said lower skirt for supplying pressurized fluid thereto.

4. A gas-cushion vehicle as set forth in claim 3 wherein said lower skirt is composed of a plurality of successive independent deflectable flexible members, each of said flexible members having an outer portion which extends outwardly away from said vehicle and a pair of spaced sidewall members extending inwardly toward said air-cushion chamber, and said constraining means being connected to said lower skirt to support the uppermost edge portions thereof.

5. A gas-cushion vehicle as set forth in claim 3 wherein said lower skirt has a plurality of segments, each of said segments having a pair of spaced sidewall portions merging with an outer wall portion defining a chamber that communicates with said air-cushion chamber, each of said segments having an upper edge that is secured to said fabric material along said constraining means, and said fabric material having a plurality of apertures communicating said plenum chamber with the chamber defined by the outer wall portion and the spaced sidewall portions of said segments.

6. A gas-cushion vehicle for operation over water comprising a vehicle body; said body having a front skirt assembly, a rear skirt assembly and sidewall structures which cooperate to define an air-cushion chamber for the containment of a cushion of air for supporting said body; said front skirt assembly having an upper skirt and a lower skirt, said upper skirt having a plurality of cables horizontally spaced extending in vertical planes; the respective ends of said cables attached to said body; fabric material extending along the entire extent of said cables and secured thereto along the full length thereof; said fabric material cooperative with said body to define a closed plenum chamber; means connected to said plenum chamber for pressurization thereof; said lower skirt being a plurality of segments; each of said segments having an outer wall portion merging with spaced sidewall portions defining a chamber that communicates directly with said air-cushion chamber; each of said segments having an upper edge that is secured to said fabric material along said cables; and said fabric material having a plurality of apertures communicating said plenum chamber with each of said chambers of said segments and said air-cushion chamber.

7. A gas-cushion vehicle as set forth in claim 6 wherein said cables form an arcuate curve in vertical cross-section.

8. An air-cushion vehicle as set forth in claim 6 wherein said rear skirt assembly has an upper rear skirt and a lower rear skirt; said upper skirt cooperative with said body to define a rear upper chamber; said lower rear skirt has a plurality of successive independent flexible segments; each of said rear segments having a pair of sidewalls, a front and rear wall portion; said wall portions and said pair of sidewalls of each segment being joined at their upper ends to said upper rear skirt and cooperative therewith to form a rear upper chamber; said front wall portion of each of said segments having a plurality of apertures for communicating said rear lower chamber with said air-cushion; said rear upper chamber communicates with chamber; said rear lower chamber; and means connected to said rear upper chamber for pressurization thereof.

9. An air-cushion vehicle as set forth in claim 8 wherein said upper rear skirt and all of said rear segments are interconnected by a plurality of laterally spaced cables extending in a plurality of vertical planes.

10. A gas-cushion vehicle having a skirt assembly adapted to form a part of a boundary of the gas-cushion space for supporting such vehicle, said skirt assembly having an upper and lower skirt portion; said upper skirt portion cooperative with said vehicle to define a closed chamber; means connected to said closed chamber for pressurization thereof; said lower skirt portion having a plurality of segments depending from said upper skirt portion; each segment having a pair of flexible sidewall members; adjacent sidewall members of adjacent segments being contiguous; each segment having a bridging portion interconnecting said sidewall members to define an arcuate shaped member in cross-section having said bridging portion extending away from said vehicle; said sidewall members extending inwardly toward the gas-cushion space for supporting said vehicle; passageway means interconnecting said closed chamber with the space of each segment bounded by said sidewall members and said bridging portion for pressurization of such space; constraining means connecting the juncture of adjacent upper outermost edges of each segment with the lower portion of said upper skirt portion; said constraining means extending in the same plane to constrain and support said upper skirt portion at a plurality of laterally spaced positions, and said constraining means having its respective end portions connected directly to said vehicle.

* * * * *